United States Patent [19]

Kennedy et al.

[11] Patent Number: 4,910,321

[45] Date of Patent: Mar. 20, 1990

[54] LIVING CATALYSTS, COMPLEXES AND POLYMERS THEREFROM

[75] Inventors: Joseph P. Kennedy; Rudolf Faust, both of Akron, Ohio

[73] Assignee: University of Akron, Akron, Ohio

[21] Appl. No.: 156,538

[22] Filed: Feb. 16, 1988

Related U.S. Application Data

[63] Continuation-in-part of Ser. No. 746,835, Jun. 20, 1985, abandoned.

[51] Int. Cl.$^4$ ............... C07D 305/04; C07C 69/76; C07C 67/02; C07C 63/04
[52] U.S. Cl. ..................... 549/213; 560/103; 560/112; 560/113; 560/261; 560/265; 560/266; 562/493; 562/495; 562/606
[58] Field of Search ............... 549/213; 560/261, 265, 560/266, 103, 112, 113; 562/494, 495, 606

[56] References Cited

U.S. PATENT DOCUMENTS

| | | | |
|---|---|---|---|
| 2,415,172 | 2/1947 | Horeczy | 502/156 |
| 2,588,358 | 4/1948 | Carleson et al. | 585/525 |
| 3,210,408 | 10/1965 | Baun et al. | 560/112 |
| 3,862,101 | 1/1975 | Milkovich et al. | 525/292 |
| 3,963,772 | 6/1976 | Takeshita | 260/485 H |
| 4,031,159 | 6/1977 | Mandel et al. | 260/683.15 H |

FOREIGN PATENT DOCUMENTS 734498 8/1955 United Kingdom ............ 260/676 R

OTHER PUBLICATIONS

Kennedy et al., J. Polymer Science, Polymer Chem. Ed., vol. 18, 1523-1537, 1539-1540 (1980).

Primary Examiner—Richard L. Raymond
Assistant Examiner—Mark W. Russell
Attorney, Agent, or Firm—Oldham & Oldham Co.

[57] ABSTRACT

This invention provides a novel catalyst composed of a complex of an organic acid or its ester and a Lewis acid, preferably boron trichloride that can add olefin monomers to increase the molecular weight of the complex from as low as 200 to in excess of a million, with the complex being active viz., living, until the complex dies, viz., is decomposed or destroyed so that polymers in the liquid or easily liquefiable range of 300 to about 20,000 can be made or those more difficult to be liquefied or unliquefiable, viz., those of over 10,000 up to 100,000 or in some cases 500,000 and then those in the range of the elastomers, or moldable or extrudable plastics range having very high molecular weights, generally in excess of 100,000 up to in excess of 500,000 and having useful end groups such as the halogens and specifically chloride, allyl, acryl or methacryl, acetate or formate to name some of the more useful ones.

16 Claims, No Drawings

LIVING CATALYSTS, COMPLEXES AND POLYMERS THEREFROM

This application is a continuation-in-part of application Ser. No. 746,835 filed June 20, 1985 now abandoned.

TECHNICAL FIELD

This invention relates to a novel class of complexes, useful as living polymerization catalysts to produce novel polymers having specific end groups and especially new type polymers such as butyl rubber and related polymers. More particularly, this invention relates to novel complex compounds containing or incorporating at least one or a number of olefinic monomers but sufficient to give a range of molecular weights from the very low range of about 200, 500 or 10,000 to the extremely high range of 500,000 or a million and higher. Specifically, this invention provides a so-called living polymer preparation method that allows polymers to be made as homopolymers, random copolymers, to highly specialized block copolymers, or terpolymers, and the like.

BACKGROUND ART

Truly living polymerization, i.e., truly terminationless and chain transferless polymerizations, are a most desirable objective of the synthetic polymer chemist. If the rates of both termination and chain transfer are zero, $R_t = R_{tr} = 0$, and the rate of initiation is larger than that of propagation $R_i > R_p$, polymer molecule weights are determined by the ratio $[M]/[I]$ (i.e., monomer over initiator concentrations) and $\overline{M}_w/\overline{M}_n$ will be reasonably small. If $R_i$ is instantaneous and/or $R_i >> R_p$, then $\overline{M}_w/\overline{M}_n \sim 1.0$. Living polymerizations are not only of scientific interest, but also of great commercial consequence, and several industrial processes are based on living systems, e.g., cis-1,4-polybutadiene, triblock copolymers of styrene/butadiene/styrene, polytetrahydrofuran, but these are not carbocationic polymerization processes.

Although great efforts have been made to develop living carbocationic polymerizations, success remains rather limited. The only truly living carbocationic systems described to date are those achieved by Higashimura, Sawamoto, et al. involving the HI/I2 initiator system and the highly cationically reactive monomers such as vinyl ethers, p-methoxy styrene and N-vinyl carbazole. Under certain well-defined experimental conditions, quasiliving carbocationic polymerizations approach those of truly living polymerizations but only under quite restrictive conditions, i.e., very low temperatures, continuous slow monomer addition (when the rate of monomer addition and that of monomers consumption are equal), and even then the rate of chain transfer is not exactly zero, but only approaches zero. Also, in quasiliving polymerizations, $R_t$ is not zero, but termination is reversible so that over a reasonably long time period termination appears to be absent, hence the term "quasiliving."

DISCLOSURE OF INVENTION

Recently, we have developed a series of new initiator systems that lead us to truly living polymerization systems for olefins such as isobutylene, copolymerization systems of an olefin such as isobutylene with a diolefin such as isoprene, and to new telechelic end reactive polymers of isobutylene or related olefins.

This invention concerns a new family of initiating systems, a new process for making polymers and a series of new products having specific end groups thereon.

The family of initiating systems is based on organic acids or esters in conjunction with a Lewis acid, preferably $BCl_3$, as illustrated by the following formulae:

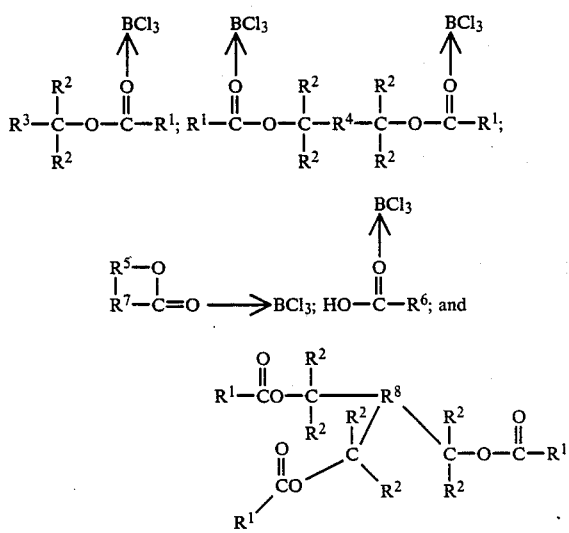

where $R^1$ in the above formula may be H, halogen, an organic moiety such as methyl and related alkyl, or aryl groups, preferably up to about 14 to 20 carbon atoms, alkylene groups such as $—CH=CH_2$ and related lower alkylene groups, preferably 2 to about 8 carbon atoms, and groups containing hetero atoms and related groups such as alkylene chloride, methylene to butylene alkoxy, preferably up to about 14 to 20 carbon atoms;

$R^2$ may be H, methyl and related alkyl groups containing preferably from 1 to about 14 to 20 carbon atoms, in general $R^2$ can be the same as $R^1$;

$R^3$ may be methyl, or related alkyls of preferably 2 to about 20 carbon atoms or aryls such as phenyl, cycloalkyls, or vinyl or allyl groups or a $CH_2=$group, in general $R^3$ can be the same as $R^2$;

$R^4$ may be $-(CH_2)_x$, or other moiety such as $—CH_2—CH_2—$, acetylenic such as $—C\equiv C—$, or arylene such as

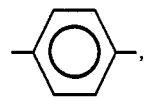

or ethylenic such as $—CH=CH—$ and related homologous groups; where x is 1 to about 20 and preferably 1 to 10 in value;

$R^5$ may be alkylenes such as $—CH_2—$, and substituted alkylenes such as

or other well known groups where H and methyl have been replaced to produce the related homologous series that yield many lactones having alkyl, aryl, alkaryl, arylalkyl and cycloalkyl groups substituted on the carbon in the lactone ring;

$R^6$ may be the same as $R^1$ but preferably limited to H or alkyls such as methyl or ethyl or aryl; and $R^7$ is an alkylene group containing carbon atoms to complete the lactone ring over the range of 3 to about 20 carbon atoms or more or an alkylene group having the hydrogen atoms on at least one of the carbon atoms substituted with other carbon atoms or customary carbon atoms substituents;

$R^8$ may be a three valent organic moiety such as

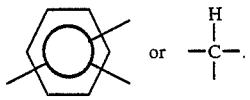

It should be appreciated that $R^2$ in the above formulae can be the same or different.

BEST MODE FOR CARRYING OUT THE INVENTION

The polymerization can be carried out at an appropriate temperature by contacting preferably in a liquid diluent the olefinic monomer or monomers, the organic acid or ester and $BCl_3$ or related Lewis acid. The diluents preferably are hydrocarbons such as n-butane, n-pentane, n-hexane, isopentane, neopentane, benzene, toluene, methylcyclohexane or chlorinated hydrocarbons such as $CH_2Cl_2$, $CH_3Cl$, $C_2H_5Cl$, chlorobenzene, ethylidene dichloride, propyl chloride, to name a few of the representative ones well known to the art. Mixed solvents can also be used.

As to the mixing sequence of the ingredients, they may be done without regard to sequence. For example, one can premix the organic ester and $BCl_3$ in a solvent and then add the monomer in a solvent and then add the $BCl_3$ in a solvent. Generally, the polymerization starts upon the introduction of the last needed ingredient when the temperature is maintained below the decomposition temperature of the complex which generally is below minus 10° C. but in some cases may be above 40° C. Bulk polymerization, i.e., in the absence of a solvent, can also be carried out.

The polymerization, generally, can be carried out continuously by mixing two streams of chemicals, ester and $BCl_3$ preferably mixed with monomer in appropriate solvents, or ester and monomer mixed with $BCl_3$ or related Lewis acid at a temperature below the decomposition temperature of the complex formed.

In a special embodiment, we also have discovered that the polymerization can be carried out above the decomposition temperature of the complex provided certain precautions are taken, to give savings in refrigeration costs and thus achieve economy in production. These precautions in one embodiment call for the complex of an organic acid or ester with a Lewis acid to be formed below the decomposition temperature of the complex and be maintained below such temperature until their use to initiate the polymerization.

Since the formation of the initiating organic acid or ester-Lewis acid complex is instantaneous, in another embodiment, the reaction can also be carried out by mixing the monomer and initiator, and then introducing the Lewis acid, at a temperature that is higher than the decomposition temperature of the initiating complex. These complexes may have its molecular weight increased by addition of the olefin monomers thereto, either alone, in combination, or in series, at a temperature below or above the complexes decomposition temperature provided the temperature at which the addition or polymerization of the olefin occurs is such that the rate of decomposition of the complex is low so that the decomposition of the complex does not prevent or occur before the polymerization of the olefin.

In this special embodiment, the premade or in situ made complex of an organic acid or ester and a Lewis acid at a temperature where the half life of the complex is about 5 minutes to an hour or more is mixed with the olefin monomer or monomers with or without suitable solvents at a temperature where the polymerization rate preferably is sufficient to substantially complete the polymerization prior to decomposition of a sufficient amount of the complex to stop or prevent the polymerization going to the desired degree of completion. For instance, the premix of the ester and monomer is made and then mixed with the Lewis acid or, in some cases, mixture of Lewis acid can form the complex essentially instaneously and thus initiate monomer polymerization and complete said polymerization prior to decomposition of the complex to prevent formation of polymer of the desired molecular weight.

To specifically illustrate this special embodiment, any of the complexes set forth herein or made according to the teachings hereof, could be made at a temperature below its decomposition temperature, for instance about minus 10° C. to minus 40° C., preferably in a hydrocarbon or chlorohydrocarbon solvent at a very high concentration, viz., a catalyst concentrate. Then, this premade complex is added with mixing to a suitable reactor that contains the olefin monomer at a temperature of about 10° to 50° C., where the complex effects polymerization of the olefin in the mixture at a temperature preferably of about 10° to 50° prior to decomposition of sufficient complex to stop the polymerization prior to obtaining a polymer of the desired molecular weight.

In another embodiment, the premade complex made below its decomposition temperature simultaneously is charged and mixed with the monomer to give a mixture above the decomposition temperature of the complex, and the mixing is controlled to give a temperature where the rate of decomposition of the complex is sufficiently so low that the undecomposed complex effects sufficient polymerization of the monomer to give the desired polymer of the desired molecular weight. It being understood that when sufficient amount of the complex has decomposed, the reaction stops. Thus, we have discovered that polymerization under these special embodiment conditions can be practiced because the rates of polymerizations are relatively fast, usually being complete in a manner of one to three minutes and in nearly all cases, in a matter of 30 minutes while the rate of decomposition is such to give a half life of about 5 minutes to an hour at temperatures of about 20° C. to 30° C. Therefore, not only homopolymers but copolymers and block polymers can be made above the decomposition temperature of the complex when these precautions are taken.

The polymerization most likely occurs by the opening of the ester bond and monomer insertion, as illustrated by the following schematic and illustrative equation:

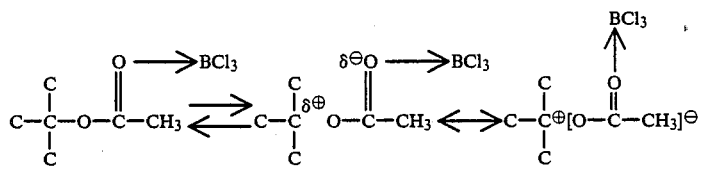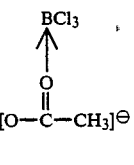

Using the last formula in the above equation, we will exemplify the monomer insertion in the following schematic equation:

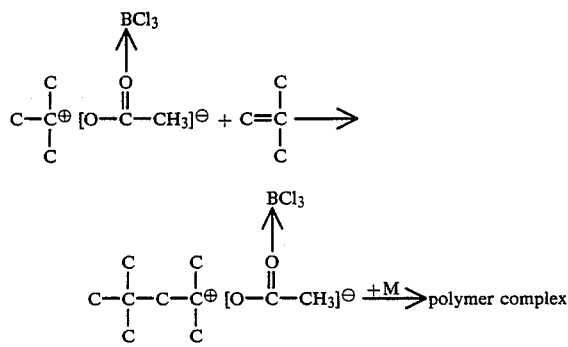

The complex counter anion is supernonnucleophilic, i.e., it does not assist or cause proton elimination from the carbocation. This is a very important characteristic that distinguishes our counter anions from other known nonnucleophilic counter anions, e.g., $BCl_4^\ominus$, $BF_4^\ominus$, and $AlCl_4^\ominus$. In conventional polymerizations taking place in the presence of simple nonnucleophilic counter anions, the latter assists or causes proton elimination from the growing carbocationic center and thus a species arises that proceeds to protonate monomer. For example, with $BF_4^\ominus$ counter anion:

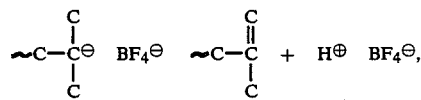

the latter protonates incoming monomer as follows:

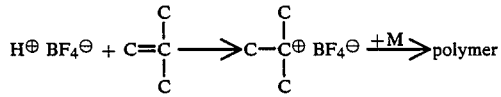

This sequence of events constitutes chain transfer to monomer and it is a most undesirable process for polymer chemists. First of all, this process reduces the molecular weight of the polymer that is formed, and secondly it yields polymers carrying an undesirable unreactive head-group

Molecular weight control in systems that involve chain transfer to monomer is more difficult to achieve than in systems devoid of this process. Thus, an advantage of our invention is it avoids the above two shortcomings.

The complex anion of our invention is supernonnucleophilic and as such does not assist or cause deprotonation of the growing carbocationic center. Thus, chain transfer to monomer will not occur in our systems, and consequently molecular weight control can be accomplished by adjusting the relative concentrations of monomer and initiating system, i.e., molecular weight is a function of $[M]_o/[I]_o$, where the subscripts include initial concentrations. The polymer will grow as long as monomer is available and the monomer is not prevented from reacting with the growing center, for example, by the growing center being coagulated from the system or decomposition of sufficient $[I]_o$ to stop the polymerization.

Also on account of the supernonnucleophilic nature of our counter anions, the polymerization is devoid of termination, i.e., the polymerization is relatively terminationless until the temperature exceeds the decomposition temperature of the complex for sufficient time to reduce the $[I]_o$ to zero. The growing center is kept "alive" for extended periods of time without losing its propogating ability. In contrast, in conventional polymerization termination occurs most likely by a reaction between the growing cation and associated counter anion, for example as set forth hereinafter:

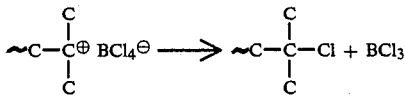

While uninterrupted growth can be maintained for extended periods of time with systems containing supernonnucleophilic counter anions, if termination is desired, say for the preparation of low molecular weight end-functionalyzed polymer, such a premature termination reaction can be brought about by either increasing the temperature of the polymerization system and thus decomposing the active growing complex, or by adding a strong nucleophilic terminating agent, such as methanol or ethanol, pyridine, ammonia, an alkyl amine, or water. Thus, our invention provides a mechanism of varying the molecular weight from several hundreds to the millions. These reactions may result in a Cl-terminated polymer (or a halogen-terminated polymer) most likely because of the following termination reaction:

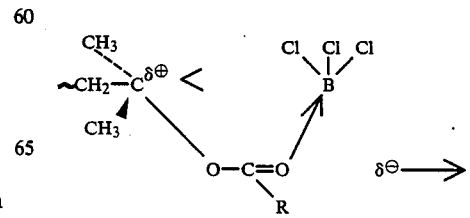

-continued

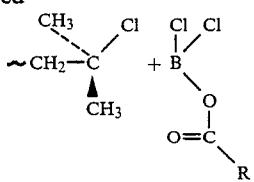

The concurrently formed BCl₂ ester is unstable and is converted to other products. The tert.-chloride end group is a valuable end function and can be used in a variety of well known applications.

The BF₃ complex yields acetate end groups under the same conditions by decomposition of the catalyst complex. The acetate end group is a valuable function, and its production yields a new composition of matter having valuable properties. For instance, it can be hydrolyzed to the alcohol end group to produce another new composition as illustrated by the following equation:

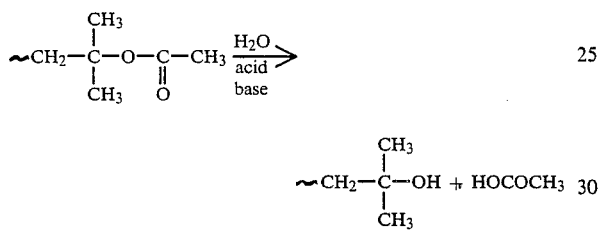

Any of the well known olefin-based monomers may be used in this invention to produce polymers. The alpha-olefins having usually from 2 to about 20 and preferably 4 to 8 carbon atoms may be used alone or in conjunction with themselves with a diolefin, either conjugated or nonconjugated, to produce polymers or copolymers of varying molecular weight even as low as 300 to in excess of a million. These polymers can be low molecular weight liquid or viscous polymers of about 200 or 500 to 10,000 molecular weight units or the solid waxy to plastic or elastomeric materials of greater than 100,000 to 500,000 to a million or more molecular weight units. Examples of these olefins are those having 2 to 20 or more carbon atoms and are readily available as specific species such as ethylene, propylene, butylene, amylenes, hexylenes, heptylenes, octylenes, the styrenes, alpha-methyl styrenes, or the dienes either nonconjugated or conjugated such as butadiene, isoprene, piperylene, hexadienes and the octadienes, and the cyclic analogues of these such as 1,3-cyclohexadiene, to name a few of the well known and representative members.

·Examples of the Lewis acids useful in this invention are BCl₃, BF₃, AlCl₃, SnCl₄, TiCl₄, SbF₅, FeCl₃ and ZnCl₂. Although BCl₃ and BF₃ are the preferred species, the other halogens and the Lewis acids also can be used by replacing one member for another one. Any of the organic acids and esters may be used provided they form a stable complex with the Lewis acids at a suitable polymerization temperature usually about minus 40° C. up to about 10° to 20° C., or if the rate of decomposition of the complex at higher temperatures is lower than the rate of polymerization. Also, the organic acids can be monocarboxylic acids, such as formic, acetic, and their homologues, say from 1 to 20 carbon atoms, with those less than 6 carbon atoms being preferred. The di- and tricarboxylic acids and higher can also be used. The mono-, di- and trifunctional acids offer a means of making polymers having certain specific mono-, di- or tri-end group functions such as chloride, formate, allylic, acrylic or methacrylic.

The nature of this invention and its many aspects and advantages may be more readily understood and appreciated by reference to the following representative and illustrative examples.

The general polymerization process used in Examples 1 to 11 was as follows:

A series of test tube runs were made by charging each test tube with solvent, monomer, viz., isobutylene, sometimes abbreviated as IB herein, and an initiator. The polymerization was started by the addition of BCl₃ with or without solvent being present with the temperature being as given. The concentrations and results of these runs are given in Tables I through XII, according to the experimental run listed. The polymerization was, in most cases, very rapid, i.e., the conversions reached their final values within a few minutes. Nevertheless, to be sure that the reactions did proceed to completion, the polymerization time was extended to 30 minutes. After this time, the reactions were quenched by the addition of 3.0 ml of prechilled methanol. The polymer was recovered by a conventional workup, i.e., evaporation of volatiles, dissolution in n-hexane, decantation or filtration of inorganic residues such as boron compounds or the other Lewis acid residues, removal of hexane by evaporation at room temperature, etc. The fact that the products were not washed insured complete product recovery; i.e., no loss of low molecular weight components. The polymer products were characterized by a variety of techniques including IR, ¹H and ¹³C NMR spectroscopy, osmometry and GPC with dual detection with infrared and ultraviolet.

EXAMPLE 1

A series of experiments were made using tert.-butyl acetate as the initiator. The results of the individual experiments, a total of 23 runs, are shown in Table I, together with the conditions (concentration of chemicals, temperatures, etc.) used.

According to the data, tert.-butyl acetate is an efficient initiator, molecular weight control can be readily achieved by controlling the [M]₀ and [I]₀, and chain transfer to monomer is absent even at 0° C. Since chain transfer to monomer did not occur at the relatively high temperature of 0° C., this reaction is also absent in runs carried out at lower temperatures, as indicated by ¹H NMR spectroscopy. Further, based on a variety of analytical techniques (IR, ¹H NMR, GPC), the polymers contain a tert.-butyl head group and a tert.-chlorine tail group, as shown by the following formula:

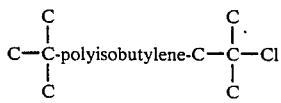

using isobutylene as the monomer.

TABLE I

| | Monomer: | | isobutylene [M] = 1 mol/l | | | | |
|---|---|---|---|---|---|---|---|
| | Initiator: | | tert.-butylacetate [I] = as stated, mol/l | | | | |
| | Coinitiator: | | $BCl_3$ $[BCl_3] = 2.6 \times 10^{-1}$ mol/l | | | | |
| | Solvent: | | as stated | | | | |
| | Polymerization Time: | | 30 minutes, unless stated otherwise | | | | |
| Run Number | Temp. °C. | Solvent | [I] | Conversion Percent | $\overline{M}_n$ | $\overline{M}_w$ | $\overline{M}_w/\overline{M}_n$ |
| 1a | | | $2.8 \times 10^{-2}$ | 74.5* | 6000 | 9400 | 1.6 |
| 1b | −50° C. | $CH_3Cl$ | $2.8 \times 10^{-2}$ | 100* | 7370 | 15000 | 2.0 |
| 1c | | | $5.6 \times 10^{-2}$ | 100 | 4240 | 7210 | 1.7 |
| 1d | | | $5.6 \times 10^{-2}$ | 100 | 4340 | 7420 | 1.7 |
| 1e | | | $5.6 \times 10^{-3}$ | 9.4 | 27400 | 48800 | 1.8 |
| 1f | | | $5.6 \times 10^{-3}$ | 13.5 | 31000 | 48200 | 1.5 |
| 1g | | | $5.6 \times 10^{-3}$ | 55.0** | 22000 | 39000 | 1.8 |
| 1h | | | $2.8 \times 10^{-2}$ | 43.5 | 5480 | 10200 | 1.8 |
| 1i | −30° C. | $CH_3Cl$ | $2.8 \times 10^{-2}$ | 87.5 | 4130 | 8400 | 2.0 |
| 1j | | | $2.8 \times 10^{-2}$ | 100 | 4650 | 8930 | 1.9 |
| 1k | | | $5.6 \times 10^{-2}$ | 100 | 2950*** | 5590 | 1.9 |
| 1l | | | $5.6 \times 10^{-2}$ | 100 | 3360*** | 6290 | 1.9 |
| 1m | | | $5.6 \times 10^{-2}$ | 100 | 3200*** | 6200 | 1.9 |
| 1n | | | $5.6 \times 10^{-2}$ | 100 | 2750*** | 5600 | 2.0 |
| 1o | | | $5.6 \times 10^{-3}$ | 100 | 27500 | 66800 | 2.4 |
| 1p | −30° C. | $CH_2Cl_2$ | $2.8 \times 10^{-2}$ | 100 | 4230 | 10420 | 2.4 |
| 1q | | | $5.6 \times 10^{-2}$ | 100 | 2470*** | 5950 | 2.4 |
| 1r | −20° C. | $CH_2Cl_2$ | $2.8 \times 10^{-2}$ | 100 | 5940 | 10700 | 1.8 |
| 1s | | | $5.6 \times 10^{-2}$ | 100 | 2260*** | 6900 | 3.0 |
| 1t | −10° C. | $CH_2Cl_2$ | $2.8 \times 10^{-2}$ | 100 | 4370 | 9200 | 2.1 |
| 1u | | | $5.6 \times 10^{-2}$ | 100 | 2040*** | 5090 | 2.5 |
| 1v | 0° C. | $CH_2Cl_2$ | $2.8 \times 10^{-2}$ | 100 | 4000 | 8100 | 2.0 |
| 1w | | | $5.6 \times 10^{-2}$ | 100 | 2100*** | 4560 | 2.2 |

*In these experimental runs, the polymerization time was 1 hour
**In these experimental runs, the polymerization time was 100 minutes
***Examination of the polymer showed the absence of terminal unsaturation in the product indicating the absence of chain transfer to the monomer.

TABLE II

| | Monomer: | | isobutylene, [M] = 1 mol/l | | | | |
|---|---|---|---|---|---|---|---|
| | Initiator: | | 2,4,4-trimethylpenty-2-acetate [I] = as stated | | | | |
| | Coinitiator: | | $BCl_3 = 2.6\ 10^{-2}$ mol/l | | | | |
| | Solvent: | | as stated | | | | |
| | Temperature: | | as stated | | | | |
| | Polmerization Time: | | 30 minutes | | | | |
| Run Number | Temp. °C. | Solvent | [I] | Conversion % | $\overline{M}_n$ | $\overline{M}_w$ | $\overline{M}_w/\overline{M}_n$ |
| 2a | | | $5.6 \times 10^{-3}$ | 100 | 10500 | 21500 | 2.0 |
| 2b | −50° C. | $CH_3Cl$ | $2.8 \times 10^{-2}$ | 100 | 1800 | 6300 | 3.6 |
| 2c | | | $5.6 \times 10^{-2}$ | 100 | 1400 | 3400 | 2.4 |
| 2d | | | $5.6 \times 10^{-3}$ | 100 | 10770 | 15750 | 1.46 |
| 2e | −30° C. | $CH_3Cl$ | $2.8 \times 10^{-2}$ | 100 | 2090 | 5320 | 2.5 |
| 2f | | | $2.8 \times 10^{-2}$ | 100 | 2200 | 5650 | 2.5 |
| 2g | | | $5.6 \times 10^{-2}$ | 100 | 1290 | 2800 | 2.2 |
| 2h | −30° C. | $CH_3Cl$/n-hexane (60:40) | $2.8 \times 10^{-2}$ | 100 | 2260 | 3150 | 1.39 |

EXAMPLE 2

Another series of experiments were made using 2,4,4-trimethylpentyl-2-acetate as the initiator instead of the tertiary butyl acetate of Example 1. The solvent was mixed with the initiator and monomer at the temperature indicated for the various runs in Table II and then were added to the reactor, and last the $BCl_3$ was added. The runs from 2a through 2h show the molecular weight varied from about 1,300 to in excess of 10,000.

EXAMPLE 3

The experimental conditions of Examples 1 and 2 were used in this example except the initiator was benzyl acetate and the temperature varied from minus 30° to minus 50° C. and showed that polymer was produced over the range of molecular weights from about 30,000 to 125,000 and higher. The data for these experiments 3a through 3d is shown in Table III.

Ultraviolet spectrographic analysis of the polymers of Table III indicated the phenyl ring was in the polymer. Benzyl acetate is an initiator in conjunction with $BCl_3$ for the polymerization of an olefin such as IB, and molecular weight control is possible. These polymers are new and have the following generic structure.

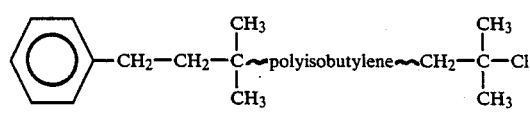

Thus, this method provides a method to produce polymers where the polyolefin segment can be any olefin segment such as polyisobutylene or PIB, polypentene, polyhexene, polyheptene, polyoctene, polystyrene, poly-alpha-methylstyrene, to name a few of the more common olefin monomer segments, or mixtures of these alpha-olefins or other alpha-olefins.

TABLE III

Monomer: isobutylene, [M] = 1 mol/l
Initiator: benzyl acetate, [I] = as stated, mol/l
Coinitiator: $BCl_3$ $[BCl_3]$ = 2.6 × $10^{-1}$, mol/l
Solvent: $CH_3Cl$
Polymerization Time: 30 minutes

| Run Number | Temperature °C. | [I] | Conversion % | $\bar{M}_n$ | $\bar{M}_w$ | $\bar{M}_w/\bar{M}_n$ |
|---|---|---|---|---|---|---|
| 3a | | 5.6 × $10^{-3}$ | 8.4 | 126300 | 228700 | 1.8 |
| 3b | −50° C. | 2.8 × $10^{-2}$ | 9.4 | 80200 | 139100 | 1.7 |
| 3c | | 5.6 × $10^{-2}$ | 12.5 | 66700 | 115800 | 1.7 |
| 3d | −30° C. | 5.6 × $10^{-2}$ | 5.6 | 36100 | 6100 | 1.7 |

EXAMPLE 4

A series of experiments were made according to the procedure of Example 1 using cumyl acetate as the initiator and the results of these experiments are reported in Table IVa, IVb, and IVc.

NMR and ultraviolet analysis of the polymer of Table IVa indicated the structure shown:

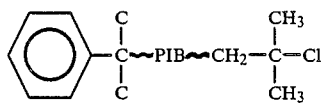

This structure is the same structure obtained by the polymerization of IB with the known cumyl chloride inifer system.

TABLE IV(a)

Monomer: isobutylene, [M] = mol/l
Initiator: cumyl acetate, [I] = as stated, mol/l
Coinitiator: $BCl_3$ expressed as $[BCl_3]$ = 2.6 × $10^{-1}$ mol/l
Solvent: $CH_3Cl$
Polymerization Time: 30 minutes
Temperature: −30° C.

| Run Number | [I] | Conversion % | $\bar{M}_n$ | $\bar{M}_w$ | $\bar{M}_w/\bar{M}_n$ |
|---|---|---|---|---|---|
| 4a | 5.80 × $10^{-4}$ | 16.2 | 19300 | 32700 | 1.7 |
| 4b | 5.84 × $10^{-3}$ | 100* | 8510 | 13600 | 1.6 |
| 4c | 2.92 × $10^{-2}$ | 100 | 2000 | 3400 | 1.7 |
| 4d | 5.84 × $10^{-2}$ | 100 | 1160 | 2820 | 2.4 |

*Conversion was 100% after 1 minute of polymerization time.

TABLE IV(b)

Monomer: isobutylene, [M] = 1 mol/l
Initiator: cumyl acetate, [I] = as stated, mol/l
Coinitiator: $BCl_3$ expressed as $[BCl_3]$ = 2.8 × $10^{-1}$ mol/l
Solvent: $C_2H_5Cl$
Polymerization Time: 30 minutes
Temperature: −30° C.

| Run Number | [I] | Conversion % | $\bar{M}_n$ | $\bar{M}_w$ | $\bar{M}_w/\bar{M}_n$ |
|---|---|---|---|---|---|
| 4b/a | 5.6 × $10^{-3}$ | 100* | 9500 | 14100 | 1.48 |
| 4b/b | 2.8 × $10^{-2}$ | 100 | 2390 | 3980 | 1.66 |
| 4b/c | 5.6 × $10^{-2}$ | 100 | 1260 | 2050 | 1.6 |

*conversion was 100% after 1 minute polymerization time.

TABLE IV(c)

Monomer: isobutylene, [M] = as stated, mol/l
Initiator: cumyl acetate, [I] = 5.6 × $10^{-3}$ mol/l
Coinitiator: $BCl_3$ $[BCl_3]$ = 2.8 × $10^{-1}$ mol/l
Solvent: $CH_2Cl_2$
Polymerization Time: 30 minutes
Temperature: −10° C.

| Number | [M] | Conversion % | $\bar{M}_n$ | $\bar{M}_w$ | $\bar{M}_w/\bar{M}_n$ |
|---|---|---|---|---|---|
| 4c/a | 0.225 | 100 | 2640 | 5000 | 1.89 |
| 4c/b | 0.45 | 100 | 5800 | 9900 | 1.7 |
| 4c/c | 0.676 | 100 | 8200 | 13900 | 1.69 |
| 4c/d | 0.9 | 100 | 10400 | 16300 | 1.57 |

EXAMPLE 5

In these experimental runs, a difunctional initiator, 2,5-dimethyl-2,5-hexane diol diacetate was used in place of the initiator of Example 4 and the polymerization temperature was lower, namely minus 50° C.

2,5-Dimethyl-2,5-hexane diol diacetate is an initiator in conjunction with $BCl_3$ for the polymerization of IB, and molecular weight control is possible. The polymer produced has the following structure.

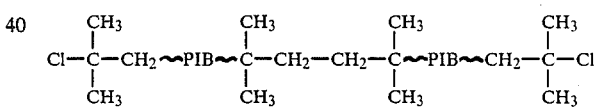

This composition has fully aliphatic telechelic end groups whereas the prior art telechelic polymers contained partial aromatic end groups. Again, this method provides a method to produce the above polymers where the PIB segment can be a polyolefin segment. Thus, in the generic formula for the above fully aliphatic telechelic end groups, composition of the PIB segment would be replaced with polyolefin segments, such as blocks of aliphatic olefins of about 2 to 20 carbon atoms and conjugated diolefin segments of 4 to 12 carbon atoms.

TABLE V

Monomer: isobutylene, [M] = 1 mol/l
Initiator: 2,5-dimethyl-2,5-hexane diol diacetate, [I] = as stated, mol/l
Coinitiator: $BCl_3$ $[BCl_3]$ = 2.6 × $10^{-1}$ mol/l
Solvent: $CH_3Cl$
Pol. Time: 30 minutes
Temperature: −50° C.

| Run Number | [I] | Conversion % | $\bar{M}_n$ | $\bar{M}_w$ | $\bar{M}_w/\bar{M}_n$ |
|---|---|---|---|---|---|
| 5a | 5.6 × $10^{-3}$ | 5.2 | 35100 | 60600 | 1.7 |
| 5b | 2.8 × $10^{-2}$ | 8.5 | 11100 | 20000 | 1.8 |
| 5c | 5.6 × $10^{-2}$ | 9.0 | 6150 | 12500 | 2.0 |

EXAMPLE 6

Another difunctional initiator as shown in Table VI was used in this run instead of the one used in Example 4.

Ultraviolet absorption of the polymers of Table VI indicated the presence of initiator segments, viz., triple bonds. The structure of this new polymer is as follows:

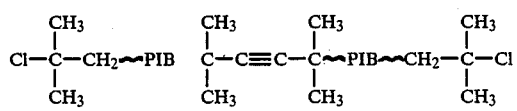

Again, we have a fully aliphatic telechelic polymer which contains an acetylenic bond therein and the PIB segment can be any polyolefin segment such as polystyrene, polyoctene, and polypropylene by changing the monomer to the desired one; say, styrene for example or octadecene. Hence, the polyolefin segment can be homopolymeric, copolymers of different olefins of either aliphatic, cycloaliphatic or aryl in nature.

TABLE VI

| Monomer: | isobutylene, [M] = 1 mol/l |
| --- | --- |
| Initiator: | 2,5-dimethyl-2,5-hexyne diol diacetate, [I] = as stated, mol/l |
| Coinitiator: | $BCl_3$ [$BCl_3$] = 2.6 × $10^{-2}$ mol/l |
| Solvent: | $CH_2Cl_2$ |
| Polymerization Time: | 30 minutes |
| Temperature: | −30° C. |

| Run Number | [I] | Conversion % | $\overline{M}_n$ | $\overline{M}_w$ | $\overline{M}_w/\overline{M}_n$ |
| --- | --- | --- | --- | --- | --- |
| 6a | 2.8 × $10^{-2}$ | 62.2 | 4000 | 5570 | 1.38 |
| 6b | 5.6 × $10^{-2}$ | 66.7 | 3000 | 4140 | 1.38 |

EXAMPLE 7

A series of runs were made at minus 30° C. with acetic acid as the initiator. The results of these runs are given in Table VII.

EXAMPLE 8

A series of runs were made at various temperatures with tert.-butyl formate as the initiator. The results are given in Table VIII.

Molecular weight control is possible by controlling [M]/[complex] ratio. Ultraviolet spectroscopy analysis indicates the presence of formate end groups in the products of Table VIII. Thus, according to this finding, we have a new composition of matter having the following structure:

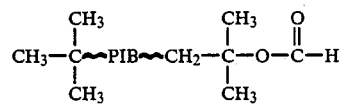

which is characterized by the presence of a formate end group.

Thus, by this method, polymers having the following structure can be made which have a formate end group:

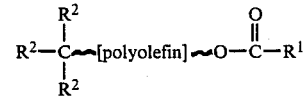

Where the initiator is a di- or trifunctional formate ester, di- and triformate terminated polyolefins are produced. Thus, homo- and copolymers having formate terminal groups are produced where $R^1$ and $R^2$ have values given hereinbefore.

TABLE VII

| Monomer: | isobutylene, [M] = 1 mol/l |
| --- | --- |
| Initiator: | acetic acid, [I] = as stated, mol/l |
| Coinitiator: | $BCl_3$ [$BCl_3$] = 2.6 × $10^{-2}$ mol/l |
| Solvent: | $CH_3Cl$ |
| Polymerization Time: | 30 minutes |
| Temperature: | −30° C. |

| Run Number | [I] | Conversion % | $\overline{M}_n$ | $\overline{M}_w$ | $\overline{M}_w/\overline{M}_n$ |
| --- | --- | --- | --- | --- | --- |
| 7a | 5.6 × $10^{-3}$ | 100 | 11600 | 14800 | 1.25 |
| 7b | 2.8 × $10^{-2}$ | 100 | 6700 | 9700 | 1.4 |
| 7c | 5.6 × $10^{-2}$ | 100 | 4700 | 6900 | 1.5 |

TABLE VIII

| Monomer: | isobutylene [M] = 1 mol/l |
| --- | --- |
| Initiator: | tert.-butyl formate [I] = as stated, mol/l |
| Coinitiator: | $BCl_3$ [$BCl_3$] = 1.1 × $10^{-1}$ mol/l |
| Solvent: | $CH_3Cl$ |
| Polymerization Time: | 30 minutes |
| Temperature: | as stated |

| Run Number | Temp. °C. | [I] | Conversion Percent | $\overline{M}_n$ | $\overline{M}_w$ | $\overline{M}_w\overline{M}_n$ |
| --- | --- | --- | --- | --- | --- | --- |
| 8a | | 5.6 × $10^{-3}$ | 100 | 9200 | 79000 | 8.6 |
| 8b | −30° C. | 2.8 × $10^{-2}$ | 100 | 1700 | 10000 | 6.0 |
| 8c | | 5.6 × $10^{-2}$ | 100 | 900 | 5100 | 5.9 |
| 8d | | 2.8 × $10^{-4}$ | 63.0 | 109700 | 211000 | 1.9 |
| 8e | | 5.6 × $10^{-4}$ | 78.1 | 66400 | 157000 | 2.4 |
| 8f | −40° C. | 1.4 × $10^{-3}$ | 100 | 40500 | 10500 | 2.6 |
| 8g | | 2.8 × $10^{-3}$ | 100 | 22500 | 71600 | 3.1 |
| 8h | | 2.8 × $10^{-4}$ | 40.0 | 252800 | 421000 | 1.67 |
| 8i | −50° C. | 5.6 × $10^{-4}$ | 58.9 | 136000 | 334000 | 2.45 |
| 8j | | 1.4 × $10^{-3}$ | 100 | 38000 | 169000 | 4.5 |
| 8k | | 2.8 × $10^{-3}$ | 100 | 22900 | 69400 | 3.0 |
| 8l | | 5.6 × $10^{-3}$ | 100 | 12000 | 35000 | 2.8 |
| 8m | | 2.8 × $10^{-2}$ | 100 | 1700 | 13000 | 8.0 |
| 8n | | 2.8 × $10^{-4}$ | 32.0 | 197000 | 340000 | 1.7 |

TABLE VIII-continued

| | | | | | | |
|---|---|---|---|---|---|---|
| Monomer: | isobutylene [M] = 1 mol/l | | | | | |
| Initiator: | tert.-butyl formate [I] = as stated, mol/l | | | | | |
| Coinitiator: | $BCl_3$ $[BCl_3]$ = 1.1 × $10^{-1}$ mol/l | | | | | |
| Solvent: | $CH_3Cl$ | | | | | |
| Polymerization Time: | 30 minutes | | | | | |
| Temperature: | as stated | | | | | |

| Run Number | Temp. °C. | [I] | Conversion Percent | $\overline{M}_n$ | $\overline{M}_w$ | $\overline{M}_w\overline{M}_n$ |
|---|---|---|---|---|---|---|
| 8o | −60° C. | 5.6 × $10^{-4}$ | 17.2 | 241000 | 383000 | 1.6 |
| 8p | | 1.4 × $10^{-3}$ | 100 | 35000 | 172900 | 5.0 |
| 8q | | 2.8 × $10^{-3}$ | 100 | 28000 | 118000 | 4.15 |

EXAMPLE 9

In these runs, the initiator was an unsaturated formate, specifically allyl formate. The polymerization conditions and results of the runs are listed in Table IX.

Thus, in the experimental runs shown in Table IX, the compound of the formula was produced.

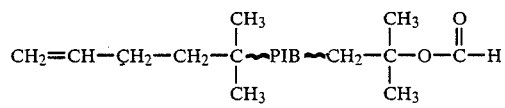

This new composition of matter has an allyl head group. Molecular weight control was achieved from relatively low molecular weights of less than 8,000 to 10,000 to 13,000 up to very high molecular weights of 40,000 to 50,000 to an excess of 100,000. By use of di-, tri- and higher functional acids or esters, it is possible to produce di-, tri- and higher allyl terminated polyolefins where the polymer may be homo, block or copolymers of the olefins of 2 to about 20 carbon atoms, for example.

TABLE IX

| | |
|---|---|
| Monomer: | isobutylene [M] = 1 mol/l |
| Initiator: | allylformate [I] = as stated, mol/l |
| Coinitiator: | $BCl_3$ $[BCl_3]$ = 2.6 × $10^{-1}$ mol/l |
| Solvent: | $CH_3Cl$ |
| Polymerization Time: | 30 minutes |
| Temperature: | −30° C. |

| Run Number | [I] | Conversion Percent | $\overline{M}_n$ | $\overline{M}_w$ | $\overline{M}_w\overline{M}_n$ |
|---|---|---|---|---|---|
| 9a | 5.6 × $10^{-4}$ | 43.4 | 87000 | 155000 | 1.8 |
| | | 44.8 | 105000 | 172100 | 1.6 |
| 9b | 1.12 × $10^{-3}$ | 77.0 | 46000 | 112000 | 2.4 |
| | | 74.2 | 58000 | 111000 | 1.9 |
| 9c | 5.6 × $10^{-3}$ | 100 | 34000 | 56000 | 1.6 |
| | | 100 | 26000 | 47000 | 1.9 |
| 9d | 2.8 × $10^{-2}$ | 100 | 15600 | 27100 | 1.7 |
| | | 100 | 13800 | 23600 | 1.7 |
| 9e | 5.6 × $10^{-2}$ | 100 | 10200 | 19500 | 1.9 |
| | | 100 | 8200 | 16900 | 2.1 |
| 9f | 1.12 × $10^{-1}$ | 100 | 6500 | 15300 | 2.3 |

EXAMPLE 10

Another series of runs were made using tert.-butyl acrylate as the initiator, the solvents are listed in Table X. The results of these runs are shown in that table. It should be appreciated that other well known acrylate or methacrylate esters, such as methyl, ethyl or alkyls of 20 or more carbon atoms with the Lewis acids may be used as initiators to produce polymers having ethylenic unsaturation as the end group. Also, the acrylic and methacrylic esters of the diols, triols, tetraols and related polyols of the monomeric to polymeric polyols can be used. Thus, with the polymeric polyols, polymers can be produced having heterogeneous oxygen therein of one or two, up to those of a few hundred to over 5,000 to 10,000.

The following new composition of matter having the important acrylic tail group has been produced:

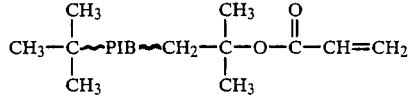

This can be used to crosslink and modify other acrylic or methacrylic polymers. Thus, these reactions with acrylic and methacrylic initiators produce a new generic class of compositions of the following formula:

where R is H or $CH_3$. Thus, it is possible by changing the functionality of the acid or ester to produce polymers having one, two, three or more acrylic groups.

TABLE X

| | |
|---|---|
| Monomer: | Isobutylene [M] = 1 mol/l |
| Initiator: | tert.-butyl acrylate [I] = as stated, mol/l |
| Coinitiator: | $BCl_3$ $[BCl_3]$ = 2.6 × $10^{-1}$ mol/l |
| Solvent: | As stated |
| Temperature: | −30° C. |
| Polymerization Time: | 30 minutes |

| Run Number | Solvent | [I] | Conversion % | $\overline{M}_n$ | $\overline{M}_w$ | $\overline{M}_w/\overline{M}_n$ |
|---|---|---|---|---|---|---|
| 10a | | 5.6 × $10^{-3}$ | 16.2 | — | — | — |
| 10b | $CH_3Cl$ | 2.8 × $10^{-2}$ | 68.5 | 3800 | 7200 | 1.9 |

TABLE X-continued

Monomer: Isobutylene [M] = 1 mol/l
Initiator: tert.-butyl acrylate [I] = as stated, mol/l
Coinitiator: BCl$_3$ [BCl$_3$] = 2.6 × 10$^{-1}$ mol/l
Solvent: As stated
Temperature: −30° C.
Polymerization Time: 30 minutes

| Run Number | Solvent | [I] | Conversion % | $\overline{M}_n$ | $\overline{M}_w$ | $\overline{M}_w/\overline{M}_n$ |
|---|---|---|---|---|---|---|
| 10c | " | 5.6 × 10$^{-2}$ | 100 | 2400 | 4200 | 1.8 |
| 10d | | 5.6 × 10$^{-3}$ | 76.8 | 11000 | 42150 | 3.8 |
| 10e | CH$_2$Cl$_2$ | 2.8 × 10$^{-2}$ | 100 | 4900 | 10700 | 2.2 |
| 10f | | 5.6 × 10$^{-2}$ | 100 | 3200 | 6900 | 2.1 |

EXAMPLE 11

To show that lactones, a special class of esters, could act as initiators with the various Lewis acids, a series of runs were made with γ-phenyl-γ-butrolactone as the initiator under conditions shown in Table XI, with the results shown. It should be noted it was possible to make polymers of very low molecular weight, less than about 4,000 to 8,000 and higher molecular weights of greater than 50,000, and the polymer at lower range was liquid to rubbery in the higher range.

TABLE XI

Monomer: isobutylene [M] = 1 mol/l
Initiator: phenyl- -butyrolactone [I] = as stated, mol/l
Coinitiator: BCl$_3$ [BCl$_3$] = 2.6 × 10$^{-1}$ mol/l
Solvent: CH$_3$Cl
Polymerization Time: 60 minutes unless stated otherwise
Temperature: −30° C.

| Run Number | [I] | Conversion Percent | $\overline{M}_n$ | $\overline{M}_w$ | $\overline{M}_w/\overline{M}_n$ | Nature of Product |
|---|---|---|---|---|---|---|
| 11a | 5.6 × 10$^{-4}$ | 42.6 | 70300 | 121700 | 1.8 | rubbery |
| 11b | | 55.7* | 51000 | 91000 | 1.8 | |
| 11c | 1.12 × 10$^{-3}$ | 22.1 | 62000 | 108000 | 1.7 | — |
| 11d | | 53.7* | 27000 | 74000 | 2.7 | |
| 11e | 5.6 × 10$^{-3}$ | 28.1 | 17870 | 33600 | 1.9 | |
| 11f | | 5.1* | 14500 | 24400 | 1.7 | |
| 11g | 2.8 × 10$^{-2}$ | 16.0 | 6380 | 33600 | 1.9 | |
| 11h | | 54.1* | 8500 | 14300 | 1.7 | |
| 11i | 5.6 × 10$^{-2}$ | 25.9 | 4870 | 8100 | 1.7 | liquid |
| 11j | | 69.8* | 6680 | 10500 | 1.5 | |
| 11k | 1.12 × 10$^{-1}$ | 100* | 4800 | 7300 | 1.5 | |

*indicates the polymerization time was extended to 2.5 hours.

EXAMPLE 12

In this series of runs at conditions of Table XII, tertiary butyl formate was used to produce polymers of propylene having an oily fluid to a viscous balsam nature. Thus, polypropylene polymers can be produced forming one or more formate terminal groups.

TABLE XII

Monomer: Propylene [M] = 1 mol/l
Initiator: Tert-butyl formate [I] = as stated, mol/l
Coinitiator: BCl$_3$ [BCl$_3$] = 2.6 × 10$^{-1}$ mol/l
Solvent: CH$_3$Cl
Temperature: −40° C.
Polymerization Time: 2.5 hours

| Run Number | [I] | Conversion % | Nature of Product |
|---|---|---|---|
| 12a | 5.6 × 10$^{-4}$ | 2.2 | viscous balsam |
| 12b | 1.11 × 10$^{-3}$ | 6.6 | viscous balsam |
| 12c | 5.6 × 10$^{-3}$ | 47.5 | viscous fluid |
| 12d | 5.6 × 10$^{-2}$ | 91.9 | viscous fluid |
| 12e | 5.6 × 10$^{-2}$ | 97.3 | oily fluid |

EXAMPLE 13

To prove the living nature of IB or related olefins initated by the supernonnucleophilic counter anion complex, a number of experiments were run and then linear plots of $\overline{M}_n$ versus grams of polymer formed in the reactor (the figures shown herein) were constructed to see if the plots are linear and whether they cross the origin on extrapolation.

These series of experiments were run in a series of test tubes which were charged with 24 ml CH$_2$Cl$_2$ 2,4,4-trimethylpentyl-2-acetate hereinafter called TMPOAc (5.6×10$^{-3}$ mol/l) and 0.5 ml IB, in that order, and thermoequilibrated at minus 30° C. Then the polymerization was started by introducing 0.5 ml BCl$_3$ (liquefied) into the test tubes. The BCl$_3$ concentration was 2.8×10$^{-1}$ mol/l in the reactor. After 30 minutes of reaction time, the reaction in the first of the test tubes was killed by the addition of methanol, whereas an additional 0.5 ml IB was added to the rest of the tubes. After 30 minutes, the reaction in the second tube was killed whereas an additional 0.5 ml IB was added to the remaining tubes. This procedure was repeated until all the charges in the series of test tubes had been quenched. After conventional workup, the amount of polymer and its molecular weight and molecular weight distribution were determined. These data are given in Table XIIIa, and the corresponding plot is given in FIG. 1.

A similar series of experiments have been carried out with a different order of reagent addition. In this experiment, the TMPOAc and BCl$_3$ were premixed in 12 ml CH$_2$Cl$_2$ and into this system was added 0.5 ml IB dissolved in 12 ml CH$_2$Cl$_2$ at minus 30° C. Thus, the initial concentrations of the ingredients, i.e., TMPOAc, BCl$_3$ and IB were the same in both series. Except for this premixing of the TMPOAc and BCl$_3$, the further course of the experiment was identical to that described above. FIG. 1 shows the plot of the results.

The fact that the $\overline{M}_n$ versus grams of PIB formed plot is linear and crosses the origin indicates the living nature of the polymerization system, i.e., each additional monomer increment contributes proportionally to the molecular weight.

The premixing of TMPOAc and BCl$_3$ technique is advantageous as it produces narrower molecular weight distribution polymer than the TMPOAc and monomer and BCl$_3$ addition sequence. This effect can be seen by inspecting the $\overline{M}_w/\overline{M}_n$ columns. The $\overline{M}_w/\overline{M}_n$ values are lower in the experiment with TMPOAc and BCl$_3$ premixing.

An identical series of experiments have been carried out using CH$_3$Cl as the diluent. The data is shown in Table XIIIb and these data also yielded a plot similar to that of FIG. 1.

An identical series of experiments have been carried out with the cumyl acetate BCl$_3$ complex initiator in CH$_2$Cl$_2$ as the solvent. The data are shown in Table XIIIc and are plotted in FIG. 2. Note that one experiment was carried out at a temperature of minus 10° C.

An identical experiment has been carried out with cumyl acetate and BCl$_3$ using CH$_3$Cl as the diluent. The data are shown in Table XIIId and are plotted in FIG. 3.

Similarly, three identical series of experiments have been carried out with cumyl acetate and BCl$_3$ in various solvent systems. A mixture on a volume basis of 80/20 CH$_2$Cl$_2$/n-hexane [Table XIIIe], a mixture of 60/40 CH$_2$Cl$_2$ [Table XIIIf], and C$_2$H$_5$Cl [Table XIIIg]. Corresponding plots of the data from these three experiments, indicated these were living polymerizations.

Finally, a series of experiments have been carried out by the dicumyl acetate BCl$_3$ complex initiator. In this system, polymer growth is expected to occur at both acetae linkages. Table XIIIh and FIG. 4 show the data for these experiments.

TABLE XIIIa

Monomer: isobutylene
Initiator: TMPOAc [I] = 5.6 × 10$^{-3}$ mol/l
Coinitiator: BCl$_3$ [BCl$_3$] = 2.8 × 10$^{-1}$ mol/l
Solvent: CH$_2$Cl$_2$ (initial charge: 24 ml)
Polymerization Time: 30 minutes between each addition
Temperature: −30° C.
Killing with MeOH (∼3 ml, precooled)

| Run Number | Isobutylene added, ml | $\overline{M}_n$ | $\overline{M}_w$ | $\overline{M}_w/\overline{M}_n$ | Polymer Formed, g |
|---|---|---|---|---|---|
| 13(a) | 0.5 | 2300 | 12400 | 5.5 | 0.30 |
| 13(b) | 0.5 + 0.5 | 3900 | 15700 | 4.1 | 0.63 |
| 13(c) | 0.5 + 0.5 + 0.5 + 0.5 + 0.5 + 0.5 | 11600 | 20050 | 1.7 | 1.80 |
| 13(d) | 0.5 | 2900 | 11350 | 3.9 | 0.31 |
| 13(e) | 0.5 + 0.5 | 4250 | 15100 | 3.6 | 0.59 |
| 13(f) | 0.5 + 0.5 + 0.5 + 0.5 | 8500 | 18700 | 2.2 | 1.20 |
| 13(g) | 0.5 + 0.5 + 0.5 + 0.5 + 0.5 + 0.5 | 11500 | 18600 | 1.6 | 1.80 |
| 13a/h | 0.5 | 3000* | 9050 | 3.0 | 0.33 |
| 13a/i | 0.5 + 0.5 + 0.5 | 7800 | 19600 | 2.5 | 0.96 |
| 13a/j | 0.5 + 0.5 + 0.5 + 0.5 + 0.5 | 10500 | 22580 | 2.1 | 1.49 |
| 13a/k | 0.5 + 0.5 + 0.5 + 0.5 + | 13000 | 22500 | 1.7 | 1.76 |

TABLE XIIIa-continued

Monomer: isobutylene
Initiator: TMPOAc [I] = 5.6 × 10$^{-3}$ mol/l
Coinitiator: BCl$_3$ [BCl$_3$] = 2.8 × 10$^{-1}$ mol/l
Solvent: CH$_2$Cl$_2$ (initial charge: 24 ml)
Polymerization Time: 30 minutes between each addition
Temperature: −30° C.
Killing with MeOH (∼3 ml, precooled)

| Run Number | Isobutylene added, ml | $\overline{M}_n$ | $\overline{M}_w$ | $\overline{M}_w/\overline{M}_n$ | Polymer Formed, g |
|---|---|---|---|---|---|
| | 0.5 + 0.05 | | | | |

*premixed initiator/coinitiator - helped to narrow MWD.

TABLE XIIIb

Monomer: isobutylene
Initiator: TMPOAc [I] = 5.6 × 10$^{-3}$ mol/l
Coinitiator: BCl$_3$ [BCl$_3$] = 2.8 × 10$^{-1}$ mol/l
Solvent: CH$_3$Cl (initial charge: 24 ml)
Polymerization Time: 30 minutes between each addition
Temperature: −30° C.

| Run Number | Isobutylene added, ml | $\overline{M}_n$ | $\overline{M}_w$ | $\overline{M}_w/\overline{M}_n$ | Polymer formed, g |
|---|---|---|---|---|---|
| 13b/a | 0.5 | 2700 | 9950 | 3.7 | 0.29 |
| 13b/b | 0.5 + 0.5 + 0.5 | 4420 | 13800 | 3.1 | 0.64 |
| 13b/c | 0.5 + 0.5 + 0.5 + 0.5 + 0.5 + 0.5 | 8000 | 19200 | 2.4 | 0.94 |
| 13b/d | 0.5 | 2800 | 10900 | 3.9 | 0.31 |
| 13b/e | 0.5 + 0.5 + 0.5 + 0.5 + 0.5 + 0.5 | 10900 | 21560 | 2.0 | 1.34 |
| 13b/f | 0.5 | 3000* | 7000 | 2.3 | 0.33 |
| 13b/g | 0.5 + 0.5 | 5300 | 9600 | 1.8 | 0.55 |
| 13b/h | 0.5 + 0.5 + 0.5 | 7200 | 13000 | 1.8 | 0.55 |
| 13b/i | 0.5 + 0.5 + 0.5 + 0.5 | 8800 | 15500 | 1.76 | 1.04 |
| 13b/j | 0.5 + 0.5 + 0.5 + 0.5 + 0.5 | 10800 | 18360 | 1.7 | 1.25 |
| 13b/k | 0.5 + 0.5 + 0.5 + 0.5 + 0.5 + 0.5 | 12850 | 20560 | 1.6 | 1.51 |

*with premixed initiator/coinitiator (30′); MWD narrowed.

TABLE XIIIc

Monomer: isobutylene
Initiator: cumyl acetate [I] = 5.6 × 10$^{-3}$ mol/l
Coinitiator: BCl$_3$ 0.5 m BCl$_3$ added in initial charge
final [BCl$_3$ ] = 2.8 × 10$^{-1}$ mol/l
Solvent: CH$_2$Cl$_2$ (initial charge: 24 ml)
Polymerization Time: 30 minutes between each addition
Temperature: −30° C.

| Run Number | Isobutylene added, ml | $\overline{M}_n$ | $\overline{M}_w$ | $\overline{M}_w/\overline{M}_n$ | Polymer formed, g |
|---|---|---|---|---|---|
| 13c/a | 0.5 | 3100 | 6200 | 2.0 | 0.31 |
| 13c/b | 0.5 + 0.5 | 5500 | 7650 | 1.4 | 0.64 |
| 13c/d | 0.5 + 0.5 + 0.5 | 6800 | 9500 | 1.4 | 0.87 |
| 13c/e | 0.5 + 0.5 + 0.5 + 0.5 + 0.5 | 8800 | 13100 | 1.48 | 1.15 |
| 13c/f | 0.5 + 0.5 + 0.5 + 0.5 + 0.5 + 0.5 | 11000 | 15800 | 1.4 | 1.45 |
| | initial solvent charge: 24 ml | | | | |
| 13c/g | 2 | 2570 | 8400 | 3.2 | 1.22 |
| 13c/h | 2 + 2 | 5600 | 10700 | 1.9 | 1.50 |
| 13c/i | 2 + 2 + 2 | 6900 | 12400 | 1.8 | 3.53 |
| 13c/j | 2 + 2 + 2 + 2 | 8900 | 15800 | 1.79 | 4.62 |
| 13c/k | 2 + 2 + 2 + 2 + 2 | 10000 | 16000 | 1.6 | 5.76 |
| | initial solvent charge: 96 ml, 2 ml BCl$_3$ added, final [BCl$_3$] concentration = 2.8 × 10$^{-1}$ mol/l | | | | |

TABLE XIIId

Monomer: isobutylene  
Initiator: cumyl acetate [I] = 5.6 × $10^{-3}$ mol/l  
Coinitiator: $BCl_3$ 0.5 m $BCl_3$ added in initial charge  
final [$BCl_3$] = 2.8 × $10^{-1}$ mol/l  
Solvent: $CH_3Cl$ (initial charge: 24 ml)  
Polymerization Time: 30 minutes between each addition  
Temperature: −30° C.  
Killing With: MeOH, ~3 ml, precooled

| Run Number | Isobutylene added, ml | $\overline{M}_n$ | $\overline{M}_w$ | $\overline{M}_w/\overline{M}_n$ | Polymer formed, g |
|---|---|---|---|---|---|
| 13d/a | 0.5 | 2730 | 5500 | 2.0 | 0.31 |
| 13d/b | 0.5 + 0.5 | 3640 | 7080 | 1.94 | 0.43 |
| 13d/c | 0.5 + 0.5 + 0.5 | 5040 | 8430 | 1.67 | 0.59 |
| 13d/d | 0.5 + 0.5 + 0.5 + 0.5 | 6560 | 10360 | 1.58 | 0.75 |
| 13d/e | 0.5 + 0.5 + 0.5 + 0.5 + 0.5 | 7160 | 11620 | 1.6 | 0.90 |
| 13d/f | 0.5 + 0.5 + 0.5 + 0.5 + 0.5 + 0.5 | 8440 | 12850 | 1.5 | 1.12 |
| 13d/g | 0.25 | 1500 | 3040 | 2.0 | 0.14 |
| 13d/h | 0.25 + 0.25 | 1860 | 3200 | 1.7 | 0.20 |
| 13d/i | 0.25 + 0.25 + 0.5 | 2530 | 4850 | 1.9 | 0.32 |
| 13d/j | 0.25 + 0.25 + 0.5 + 0.5 | 3800 | 7830 | 2.0 | 0.50 |
| 13d/k | 0.25 + 0.25 + 0.5 + 0.5 + 0.5 | 4900 | 9500 | 1.9 | 0.60 |
| 13d/l | 0.25 + 0.25 + 0.5 + 0.5 + 0.5 + 0.5 | 6600 | 12000 | 1.7 | 0.76 |

The plot of this data is shown in FIG. 4.

TABLE XIIIe

Monomer: isobutylene  
Initiator: cumyl acetate [I] = 5.6 × $10^{-3}$ mol/l  
Coinitiator: $BCl_3$ [$BCl_3$] 2.8 × $10^{-1}$ mol/l  
Solvent: $CH_2Cl_2$/n-hexane, 80 v/20 v (initial charge 24 ml)  
Polymerization Time: 30 minutes between each addition  
Temperature: −30° C.

| Run Number | Isobutylene added, ml | $\overline{M}_n$ | $\overline{M}_w$ | $\overline{M}_w/\overline{M}_n$ | Polymer formed, g |
|---|---|---|---|---|---|
| 13e/a | 0.5 | 3500 | 5560 | 1.59 | 0.36 |
| 13e/b | 0.5 + 0.5 + 0.5 | 4880 | 12950 | 2.66 | 0.55 |
| 13e/c | 0.5 + 0.5 + 0.5 + 0.5 | 5400 | 16100 | 3.0 | 0.66 |

TABLE XIIIf

Monomer: isobutylene  
Initiator: cumyl acetate [I] = 5.6 × $10^{-3}$ mol/l  
Coinitiator: $BCl_3$ [$BCl_3$] 2.8 × $10^{-1}$ mol/l  
Solvent: $CH_2Cl_2$/n-hexane, 60 v/40 v (initial charge 24 ml)  
Polymerization Time: 30 minutes between each addition  
Temperature: −30° C.

| Run Number | Isobytylene added, ml | $\overline{M}_n$ | $\overline{M}_w$ | $\overline{M}_w/\overline{M}_n$ | Polymer formed, g |
|---|---|---|---|---|---|
| 13f/a | 0.5 | 3450 | 6500 | 1.88 | 0.35 |
| 13f/b | 0.5 + 0.5 + 0.5 + 0.5 | 4580 | 11390 | 2.48 | 0.43 |
| 13f/c | 0.5 + 0.5 + 0.5 + 0.5 + 0.5 | 4750 | 12000 | 2.5 | 0.47 |

TABLE XIIIg

Monomer: isobutylene  
Initiator: cumyl acetate [I] = 5.6 × $10^{-3}$ mol/l  
Coinitiator: $BCl_3$ [$BCl_3$] 2.8 × $10^{-1}$ mol/l  
Solvent: $C_2H_5Cl$ (initial charge 24 ml)  
Polymerization Time: 30 minutes between each addition  
Temperature: −30° C.

| Run Number | Isobutylene added, ml | $\overline{M}_n$ | $\overline{M}_w$ | $\overline{M}_w/\overline{M}_n$ | Polymer formed, g |
|---|---|---|---|---|---|
| 13g/a | 0.5 | 3150 | 4830 | 1.5 | 0.33 |
| 13g/b | 0.5 + 0.5 | 3400 | 6400 | 1.9 | 0.40 |
| 13g/c | 0.5 + 0.5 + 0.5 | 3900 | 9720 | 2.49 | 0.47 |
| 13g/d | 0.5 + 0.5 + 0.5 + 0.5 | 4100 | 11520 | 2.8 | 0.54 |
| 13g/e | 0.5 + 0.5 + 0.5 + 0.5 + 0.5 | 5100 | 11350 | 2.8 | 0.61 |
| 12g/f | 0.5 + 0.5 + 0.5 + 0.5 + 0.5 + 0.5 | 5200 | 16370 | 3.1 | 0.66 |

TABLE XIIIh

Monomer: isobutylene  
Initiator: dicumyl acetate [I] = 5.6 × $10^{-3}$ mol/l  
Coinitiator: $BCl_3$ [$BCl_3$] 2.8 × $10^{-1}$ mol/l  
Solvent: $CH_3Cl$ (initial charge 24 ml)  
Polymerization Time: 30 minutes between each addition  
Temperature: −30° C.

| Run Number | Isobutylene added, ml | $\overline{M}_n$ | $\overline{M}_w$ | $\overline{M}_w/\overline{M}_n$ | Polymer formed, g |
|---|---|---|---|---|---|
| 13h/a | 0.5 | 1730 | 3090 | 1.78 | 0.32 |
| 13h/b | 0.5 + 0.5 | 2790 | 4750 | 1.7 | 0.54 |
| 13h/c | 0.5 + 0.5 + 0.5 | 4260 | 6560 | 1.54 | 0.85 |
| 13h/d | 0.5 + 0.5 + 0.5 + 0.5 | 5300 | 7610 | 1.44 | 1.09 |
| 13h/e | 0.5 + 0.5 + 0.5 + 0.5 + 0.5 | 6500 | 9430 | 1.45 | 1.28 |
| 13h/f | 0.5 + 0.5 + 0.5 + 0.5 + 0.5 + 0.5 | 7000 | 9760 | 1.39 | 1.47 |

A special embodiment of this invention relates to the random copolymerization of an alphaolefin such as those exemplified by isobutylene, propylene, pentene or hexene, with a diolefin, preferably a conjugated one such as those exemplified by isoprene, butadiene and piperylene. Thus, copolymers containing either a major or minor amount of diolefin can be produced. Isobutylene plus an isoprene copolymer containing up to 5 percent isoprene in the chain are articles of commerce. The random polymers produced by this invention have commercial utility as butyl rubbers and especially those having a molecular weight of a hundred thousand and 1 to 4 percent unsaturation. These rubbers are sulfurvulcanizable, heat stable, chemically resistant general purpose rubbers which may be used in inner tubes and inner liners of tires, tubes, curing bladders, mountings, vibration dampers, etc., and are convertible to the halogenated form of butyl rubber for other usages. Heretofore, butyl rubber was made commercially by a heterogeneous low temperature (minus 100° C.) cationic suspension polymerization by the use of $AlCl_3$ catalyst in methyl chloride diluent. In order to obtain commercially useful molecular weights, the polymerization has to be carried out at cryogenic temperatures, viz. below minus 100° C. Therefore, a lot of work has been directed towards the raising of this very low temperature requirement. Also, controlling molecular weight with the $AlCl_3$ system is difficult, it requires changes in reactor temperature. Another problem with conventional polymerizations is reactor fauling. Fauling is the process during which polymer particles crosslink and agglomerate during the run and precipitate on the inner surfaces of the reactor. This adhering layer of crosslinked or gelled polymer decreases cooling efficiency so that molecular weight control becomes impossible. Thus, the reactor has to be shut off and the fauled polymer layer removed by a separate cumbersome and costly process. Great efforts have been extended to overcome fauling.

In Example 14, copolymerization of isobutylene with isoprene was demonstrated to occur readily with our complex catalyst, and that the copolymerization yields random copolymers whose overall composition can be controlled by the isobutylene/isoprene ratio in that charge, and that the molecular weight of the butyl rubber formed can be controlled by the ratio of [monomers]/[initiating complex], and that the copolymerization is living in nature. Also, the percent unsaturation can be controlled over a wide molecular weight range to yield new copolymers of alpha-olefins and dienes which may have higher molecular weights, i.e., in excess of a hundred thousand molecular weight and having unsaturation values of 1, 2, 3 to 5 mole percent and higher. Thus, copolymers having 1 to 90 and preferably 2 to 10 percent of diolefin are readily made.

EXAMPLE 14

A series of copolymerization experiments have been carried out under the following conditions: A series of three test tubes have been charged at minus 30° C. with 22.5 ml CH$_3$Cl, 2.0 ml isobutylene (0.94 mole/l) and 0.1 ml cumyl acetate (0.56×10$^{-3}$ mole/l) in that order. Then in a series of three test tubes, isoprene was introduced, i.e., 0.05 ml (or 2.13 mole percent on isobutylene); 0.1 ml (or 4.26 mole percent on isobutylene); and 0.2 ml (or 8.52 mole percent on isobutylene) isoprene. Finally, the copolymerizations were initiated by the introduction of 0.5 ml BCl$_3$ (2.8 10$^{-1}$ mole/l). The polymerizations proceeded with occasional mixings at minus 30° C. for 30 minutes. Then the reactions were killed by adding 3 ml of prechilled methanol. After workup, the conversions, molecular weights, and overall compositions were determined. The latter was obtained by $^1$H NMR spectroscopy which also indicated that the product contained the isoprene units in the chain in a 1,4-enchainment. Table XIV shows this data.

TABLE XIV

Monomer: isobutylene [M$_1$] = 0.94 mol/l
isoprene [M$_2$] = as stated, mol/l
Initiator: cumyl acetate [I] = 5.6 × 10$^{-3}$ mol/l
Coinitiator: BCl$_3$ [BCl$_3$] 2.8 × 10$^{-1}$ mol/l
Solvent: CH$_3$Cl (initial charge 22.5 ml)
Polymerization Time: 30 minutes
Temperature: −30° C.

| Run Number | [M$_2$] | Conversion % | $\overline{M}_n$ | $\overline{M}_w$ | $\overline{M}_n/\overline{M}_w$ | Isoprene in the polymer, mole % |
|---|---|---|---|---|---|---|
| 14a | 0.02 (2.13 m %) | 85.0 | 9100 | 13100 | 1.48 | — |
| 14b | 0.04 (4.26 m %) | 74.3 | 7150 | 11400 | 1.6 | 2.91 |
| 14c | 0.08 (8.52 m %) | 51.8 | 5300 | 9300 | 1.75 | 4.3 |

EXAMPLE 15

Two additional series were carried out to demonstrate the living nature of the copolymerization. The charging of the series of tubes and the polymerization conditions have been described above in Example 14. In the first series of copolymerizations, three tubes were charged to give 4.26 mole percent isoprene in the isoprene solution (relative to isobutylene). After BCl$_3$ addition, the reactions in the first, second and third tubes were killed at 25, 30 and 45 minutes. After workup, the conversions and molecular weights were determined. The data is shown in Table XVa and FIG. 5.

The second series of copolymerizations have been carried out with 2.13 mole percent isoprene (on isobutylene) in the charge. Copolymerizations were terminated after 5 and 10 minutes after BCl$_3$ addition. In the third tube at 20 minutes, we added a fresh charge of 2.05 ml monomer mixture consisting of 2.0 ml isobutylene and 0.05 ml isoprene, i.e., a charge of 2.13 mole percent isoprene (on isobutylene), and allowed the reaction to proceed for an additional 30 minutes. After killing and workup, the conversion and the molecular weight of the polymers were determined. Table XVb and FIG. 5 show the results.

According to these data, the copolymerizations proceeded in a living manner as indicated by the linear $\overline{M}_n$ versus conversion plots crossing the origin.

The polymerizations described in this invention can be carried out as long as the initiating complex maintains its integrity to give a wide range of molecular weights. Tests determined that the tert.-butyl acetate BCl$_3$ complex is stable up until at least minus 10° C. Therefore, living and other polymerization can be carried out up to at least minus 10° C. and even to the decomposition temperature of the complex which in most cases is near ambient or 10°–30° C. below it, but some initiator complexes allows operating tempertures above 0° C. Thus, butyl rubber can be made at much higher temperatures than heretofore.

TABLE XVa

Monomer: isobutylene [M$_1$] = 0.94 mol/l
isoprene [M$_2$] = 0.04 mol/l (4.26 mol %)
Initiator: cumyl acetate [I] = 5.6 × 10$^{-3}$ mol/l
Coinitiator: BCl$_3$ [BCl$_3$] 2.8 × 10$^{-1}$ mol/l
Solvent: CH$_3$Cl (initial charge 22.5 ml)
Polymerization Time: as stated
Temperature: −30° C.

| Run Number | Polymerization Time | Conversion % | $\overline{M}_n$ | $\overline{M}_w$ | $\overline{M}_w/\overline{M}_n$ |
|---|---|---|---|---|---|
| 15a/a | 15 minutes | 58.0 | 5800 | 10480 | 1.8 |
| 15a/b | 30 minutes | 74.9 | 6900 | 11700 | 1.69 |
| 15a/c | 45 minutes | 79.3 | 7500 | 11600 | 1.55 |

TABLE XVb

Monomer: isobutylene [M$_1$] = 0.94 mol/l
isoprene [M$_2$] = 0.02 mol/l (2.13 mol %)
Initiator: cumyl acetate [I] = 5.6 × 10$^{-3}$ mol/l
Coinitiator: BCl$_3$ [BCl$_3$] 2.8 × 10$^{-1}$ mol/l
Solvent: CH$_3$Cl (initial charge 22.5 ml)
Polymerization Time: as stated
Temperature: −30° C.

| Run Number | Polymerization Time | Conversion % | $\overline{M}_n$ | $\overline{M}_w$ | $\overline{M}_w/\overline{M}_n$ |
|---|---|---|---|---|---|
| 15b/a | 5 minutes | 77.1 | 7120 | 11400 | 1.6 |
| 15b/b | 10 minutes | 84.7 | 8450 | 13400 | 1.55 |
| 15b/c | 25 minutes | — | — | — | — |

TABLE XVb-continued

Monomer: isobutylene [M₁] = 0.94 mol/l
isoprene [M₂] = 0.02 mol/l (2.13 mol %)
Initiator: cumyl acetate [I] = 5.6 × 10⁻³ mol/l
Coinitiator: BCl₃ [BCl₃] 2.8 × 10⁻¹ mol/l
Solvent: CH₃Cl (initial charge 22.5 ml)
Polymerization Time: as stated
Temperature: −30° C.

| Run Number | Polymerization Time | Conversion % | $\overline{M}_n$ | $\overline{M}_w$ | $\overline{M}_w/\overline{M}_n$ |
|---|---|---|---|---|---|
| 15b/d | 30 minutes* | 100 + 18.5 | 11200 | 16050 | 1.44 |

*After 20 minutes polymerization time, 2.05 ml new isobutylene (2 ml) - isoprene (0.05 ml = 2.13 m %) mixture was added and was allowed to polymerize for 30 minutes.

EXAMPLE 16

In this example, 0.06 ml tert.-butyl acetate (t-BuAC) and 0.2 ml BCl₃ were mixed in 20 ml CH₂Cl₂ at minus 10° C. After 1 hour at this temperature, the IR spectrum of the system (taken against the CH₂Cl₂ solvent by the use of the matched cells) indicated the presence of the t-BuAC.BCl₃ complex; i.e., presence of an absorption at 1570 cm⁻¹ associated with the stretching vibration of the >C=O→BCl₃ group (the uncomplexed >C=O shows $\nu$CO=1720 cm⁻¹ in t-BuOAC).

Upon heating the t-BuAC.BCl₃ complex to room temperature, the complex slowly decomposes to t-BuCl and CH₃COCl ($\nu$CO=1800 cm⁻¹ in CH₃COCl). After one hour at room temperature, 50 percent of the complex has decomposed.

Similar to these experiments, the TMPOAc.BCl₃ complex is stable up until minus 10° C. but it decomposes quantitatively at room temperature to TMP-Cl and CH₃COCl, upon standing at this temperature for sufficient time.

The above two experiments can be regarded as model experiments for these polymer systems. Thus when a polymer prepared by the t-BuAC.BCl₃ system in which CH₃Cl diluent at minus 30° C. after 30 minutes polymerization was examined, it showed the characteristic CO=1570 cm⁻¹ vibration, indicating the presence of >CO BCl₃ complex bond. After letting the system warm to room temperature overnight without killing the reaction, both ¹H NMR and IR spectroscopy showed the formation of an allyl chloride and CH₃COCl.

The fact that the polymer readily decomposes to the tert.-chloride ended structure has important preparative/synthetic implications as it provides a new avenue to valuable tert-chlorine terminated polymers. It is immediately apparent that by the use of difunctional acetate.BCl₃ complex initiators, i.e., dicumyl acetate.BCl₃ or other diacetates.BCl₃ complexes, valuable telechelic polyisobutylenes and related alpha-oelfins or diolefin polymers can be prepared.

We have also discovered that the tert.-chloride groups can be quantitatively obtained not only by treating the polymerizing system to bring it to room temperature, but also by adding various nucleophilic killing or quenching agents, i.e., CH₃OH, (C₂H₅)₃N, pyridine, ammonia, methanol, and sodium methoxide. These experiments were carried out by model and subsequent polymerization studies to show that any of the olefins can be polymerized by the Lewis acid organic acid or ester complex to give a novel polymerization process to produce new polymers.

New compositions of matter having the structure set forth in the formulae below can be made by this invention.

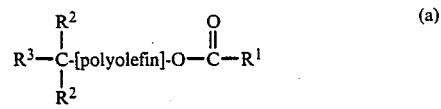  (a)

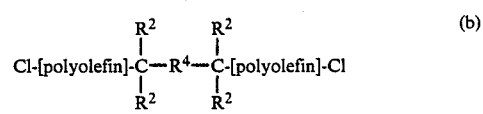  (b)

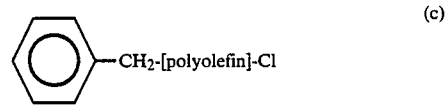  (c)

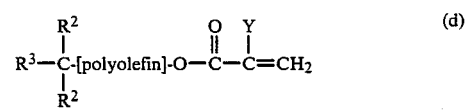  (d)

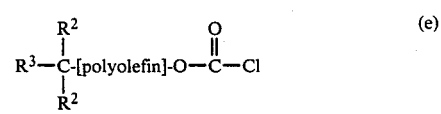  (e)

  (f)

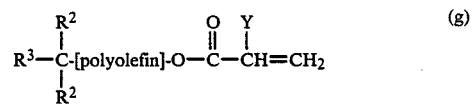  (g)

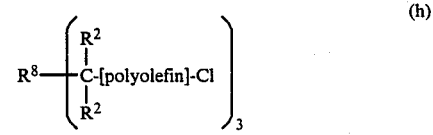  (h)

where
R¹ is hydrogen, halogen or an organic moiety of an organic acid;
R² is the same as R¹;
R³ is the same as R²;
R⁴ is methylene or polymethylene, ethylenic, acetylenic,

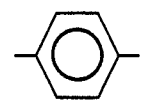

or related homologous groups;
R⁸ is a trivalent organic moiety; and
y is hydrogen or alkyl.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A method of producing a complex of an organic carboxylic acid or ester with a Lewis acid that forms supernonnucleophilic counter anion and characterized by its ability to add olefin monomers to give a living polymerization system comprising introducing an organic carboxylic acid or ester and a Lewis acid into a system and mixing without regard to sequence at a temperature below the decomposition-temperature of said complex in the presence or absence of a solvent for said complex; said system containing sufficient olefin relative to $[M]_o/[I]_o$ ratio to give the complex a molecular weight greater than 1000, where $[M]_o$ and $[I]_o$ are the initial momomer and initiator concentration, respectively.

2. The method of claim 1 wherein the temperature is below minus 10° C.

3. The method of claim 1 wherein the Lewis acid is selected from the class consisting of $BCl_3$, $AlCl_3$, $TiCl_4$, $SbF_5$, $FeCl_3$, $ZnCl_2$ and $VCl_4$.

4. The method of claim 1 wherein the Lewis acid is boron chloride.

5. The method of claim 1 wherein sufficient olefin monomer has been added while maintaining the temperature below the decomposition temperature of said complex to increase its molecular weight to within a range of greater than 1,000 to above a hundred thousand.

6. The method of claim 1 wherein the olefin reacts with the complex to give a polymer complex and to consume essentially all said olefin within a few minutes but still has ability to add more olefin.

7. The method of claim 1 wherein the molecular weight increase of said complex is proportional to monomer concentration divided by concentration of initiator concentration.

8. The method of claim 1 wherein sufficient olefin monomers is contacted with said complex to increase its molecular weight to at least 1,000.

9. The method of claim 1 wherein the complex and olefin are fed simultaneously to a reactor and the temperature produced by mixing said complex and olefin would require less than 10 minutes to decompose half of the said complex fed to the reactor.

10. A method of producing a complex of an organic carboxylic acid or ester with a Lewis acid and increasing the molecular weight of said complex by adding olefinic monomers thereto to effect a carbocationic polymerization comprising:

forming a complex of said organic carboxylic acid or ester with a Lewis acid by contacting said organic carboxylic acid or ester with said Lewis acid at a temperature below the temperature at which said complex decomposes, contacting said complex prior to substantial decomposition with at least one olefin to effect a significant increase in molecular weight of said complex to greater than 1,000.

11. The method of claim 10 wherein the temperature of the complex is below 0° C. and the olefin has a temperature sufficient to produce a mixture having a temperature above decomposition temperature of the complex upon mixing and maintaining said mixture at said temperature above the decomposition temperature of said complex but sufficiently high that less than half of the complex is decomposed in half an hour.

12. The method of claim 10 wherein the complex and olefin are fed simultaneously to a reactor and the temperature of mixture produced by their intimate mixing is above the decomposition temperature of the complex.

13. The method of claim 1 wherein the mixture temperature is about 10° to less than 50° C.

14. The method of claim 1 wherein the polymerization rate is sufficient to essentially consume all the olefin in a few minutes and the complex has a decomposition half life greater than time required to consume all the olefin.

15. The method of claim 1 wherein the complex has a decomposition half life of at least 10 minutes at a temperature of 10° C.

16. The method of claim 10 wherein polymerization occurs at a temperature above the decomposition temperature of the complex and the rate of decomposition of the complex at this temperature does not effect $[M]/[I]$ ratio sufficient to cause the $M_w/M_n$ ratio to vary more than about 1.0 to 3.5.

* * * * *